Figure 1:
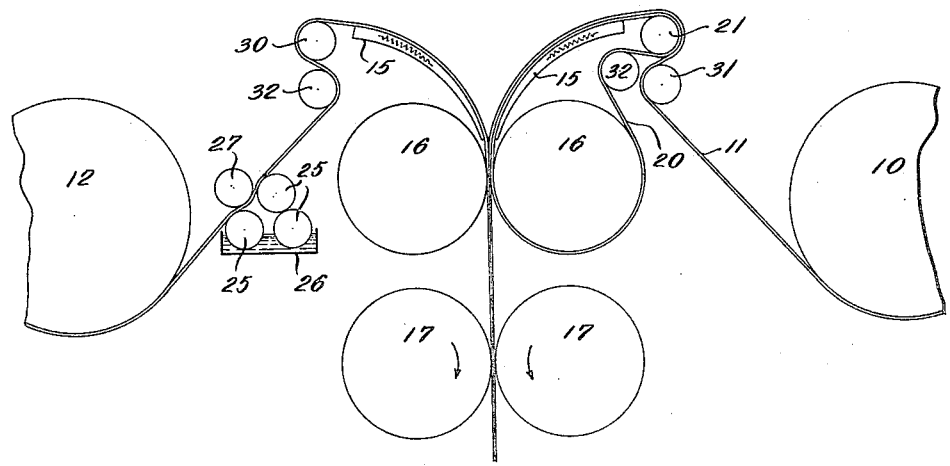

Dec. 10, 1940.  W. B. WESCOTT  2,224,370

ART OF LAMINATING MATERIALS

Filed Feb. 19, 1937

Inventor,
William B. Wescott,
by Roberts, Cushman & Woodbury
Attys.

Patented Dec. 10, 1940

2,224,370

UNITED STATES PATENT OFFICE 2,224,370

ART OF LAMINATING MATERIALS

William B. Wescott, Dover, Mass., assignor to Addressograph-Multigraph Corporation, Wilmington, Del., a corporation of Delaware Application February 19, 1937, Serial No. 126,600

6 Claims. (Cl. 154—40)

This invention or discovery relates to an improvement in the art of laminating materials and more particularly to a method of laminating material with a thermoplastic adhesive and to a mechanism therefor. It consists in heating a material coated with a thermoplastic adhesive and sometimes, but not always or necessarily, heating the material to be laminated with the said coated material and thereafter bringing the two said materials together with the hot thermoplastic adhesive between them under pressure and while under pressure cooling the adhesive and materials in a mechanism provided with means to heat the material and means to bring the said heated material into contact and to cool the same under pressure, all as more fully hereinafter described and claimed.

It has heretofore been common practice to laminate materials with a thermosplastic adhesive by combined heat and pressure, as in a hot platen press or by continuously feeding the materials to be laminated over heated rolls adapted to press the materials into contact with a layer or coating of thermosplastic adhesive interposed therebetween.

When the materials being laminated have different thermal characteristics or undergo a differential shrinkage due to moisture loss on heating, a strain is set up between them which, when the pressure is released, tends to cause a relative displacement or shrinkage of the materials. This tendency towards relative displacement is a characteristic disadvantage of prior methods because the thermoplastic adhesive is still at the plastic temperature at the moment the pressure is released.

I have now discovered that the disadvantages of prior methods of laminating materials with interposed thermoplastic adhesive may be obviated by "setting" the thermoplastic adhesive by chilling the same while the materials are pressed into contact.

It is an object of this invention to "set" or chill a thermoplastic adhesive while under initial pressure contact between the materials being laminated. It is another object of this invention to avoid objectionable differential shrinkage of the elements of a laminated sheet and thereby the resulting "curl," characteristic of strain due to such differential contraction, by so expanding that element exhibiting the least normal contraction that the shrinkage thereof after lamination is substantially equal to that of the other element.

A still further object of the invention is to provide a mechanism adapted to produce pressure contact of, and, while the pressure is exerted, to chill, at least to the "setting point," a thermoplastic adhesive between the materials being laminated.

Reference is had to the drawing in which

Figure 2:
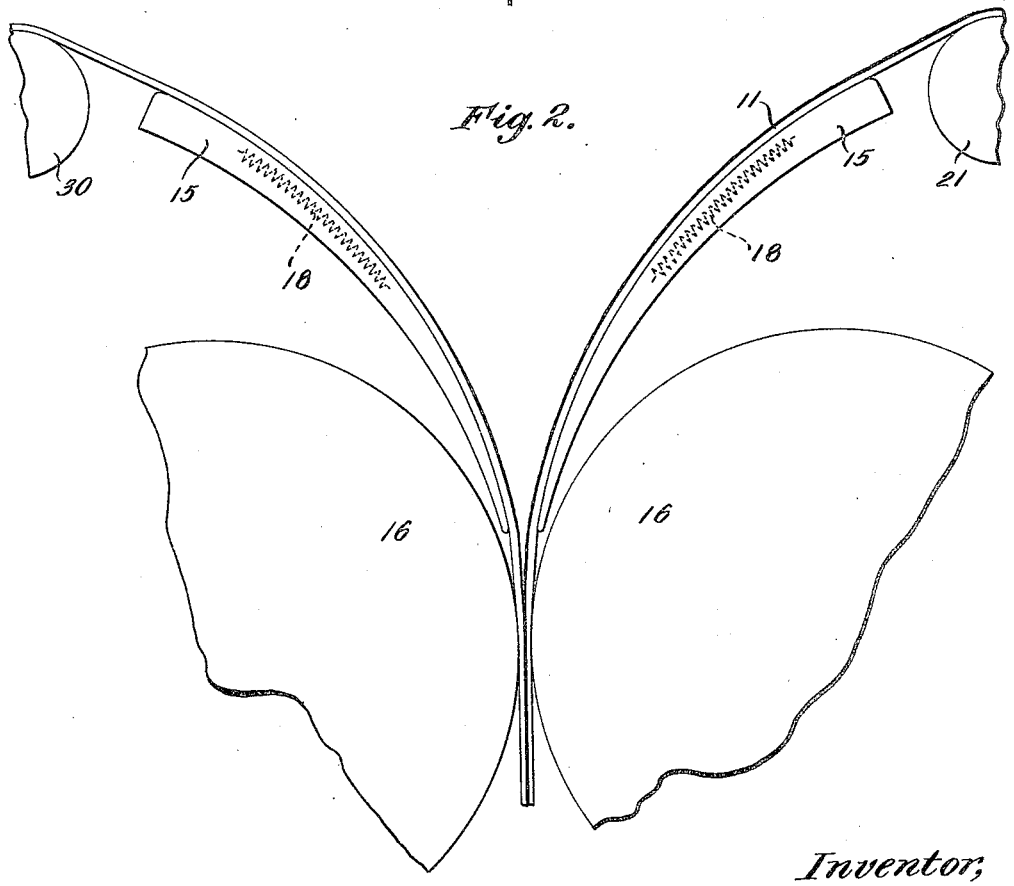

Fig. 1 is a diagrammatic representation in elevation of one arrangement of the pressing and chilling elements in a machine embodying my invention; and Fig. 2 is a similar enlarged view of a detail of the machine shown in Fig. 1, slightly modified.

It is generally expedient to have the thermoplastic adhesive present as a coating on one of the elements to be laminated, and the invention will be so described.

In Fig. 1 is shown a roll 10 of paper, Cellophane, metal foil, or the like, having a thermoplastic coating 11 on the inside and a roll 12 of backing material such as paper, fabric or the like. The webs from the rolls are passed over stationary heating elements 15 having cylindrically curved contact surfaces therefor between pressure rollers 16 and feeding rollers 17. The rollers 17 are positively driven by any suitable means and thus draw the webs from the rolls over the plates 15 and between the rollers 16.

The pressure rollers 16 are hollow and adapted to be cooled by water supplied to the interior in any suitable manner. If heavy pressure is required, as for instance when a very thin coating of adhesive is used, the rollers may be very slightly crowned. These rollers are yieldably held in contact with the webs by springs or similar means (not shown) and usually are rotated by the webs as they pass between them. It is of advantage to have the rollers rotated by the webs when the webs are of materials having different surface textures and exhibiting different coefficients of friction against the surfaces of the rollers, since thereby any tendency for one web to be displaced relative to the other due to friction is eliminated. When the webs are of materials which are very tenuous or too weak to rotate the rollers by friction alone, the rollers are driven at the same peripheral speed as the rollers 17. In general, however, it is not necessary or desirable to drive the pressure rollers positively.

The elements 15 are here shown as plates conveniently heated by electrical resistance units 18 which may be thermostatically controlled so that the elements are held at that temperature at which the thermoplastic coating 11 is adequately softened. The speed of traverse of the webs over the plates 15 must, of course, be taken into consideration in determining the temperature provided. The lower ends of the plates are brought close together and terminate as near the pressure rollers 16 as possible (see Fig. 2).

In laminating webs of cellulosic materials the best results are obtained when both elements 15 are held at substantially the same temperature. This prevents any preliminary chilling of the adhesive when the two webs are brought into contact just prior to their entry between the bite of the pressure rollers. The webs are pressed firmly into contact by the rollers 16 and at the same time a cooling action is set up. This action, beginning at the surfaces of the webs in contact with the rollers, quickly penetrates to the layer of thermoplastic adhesive and substantially chills it before it passes out from between the rollers. Thus the webs are not only laminated by the rollers but the thermoplastic adhesive has been set so that any possibility of separation or relative slipping of the webs after they leave the rollers 16 is eliminated.

When the material forming one of the webs has a high heat conductivity, for example, metal foil, there is danger that the chill from the roller 16 will cause setting of the thermoplastic layer before a full pressure contact has been made. In order to minimize this danger and retard the escape of heat from the web, an intervenor of lower heat conductivity is provided between the web and the plate and roller with which it would otherwise come in contact. As shown in Fig. 1, a continuously traveling fabric belt 20 may be employed which passes around that roller and the roller 21 and over the idler roller 22. One run of the belt thus comes into contact with the web at the roller 21 and travels with it over the plate 15. The belt 20 serves both to reduce the heating function of the plate and also to retard the cooling action of the roller. The belt is not used when webs of paper or other material possessing low heat conductivity are laminated except for support when the material is very thin or weak.

It has been noted that when some laminated webs are cut into sheets, the sheets will exhibit a tendency to curl due to the fact that the material forming one web shrinks, after heating and cooling, more than the material forming the other web. This curling is of course objectionable and may be avoided when the webs are of cellulosic material by causing a prior expansion of the web having the least shrinkage. This is conveniently done by dampening such a web prior to lamination. One way of dampening is by storing such web in an atmosphere of high humidity until the desired expansion has taken place. Another way is to apply moisture to that side of the web which contacts the heated plate 15 before reaching such plate. As shown in Fig. 1, it is assumed that the left web needs such treatment and the moisture is applied by freely rotating rolls 25 of felt or similar material supplied with moisture from a reservoir 26, the web being brought in contact with the rolls 25 by an idler pressure roll 27.

The pressure exerted on the webs by the rollers 16 may be high advantageously to ensure intimate contact. By mounting the pressure rollers 16 and the feeding rollers 17 parallel to each other in both horizontal and vertical planes, slippage of the webs under pressure is avoided. Thus one of the greatest difficulties experienced in laminating according to prior methods, particularly when one web is of material having a high density, as Cellophane or metal foil, for instance, is avoided.

The idler rollers 21, 30, 31 and 32 serve to ensure tracking of the webs so that the edges are brought into register. Such rolls are grouped into two sets (21, 31 and 30, 32) and are adjustably mounted in any well known manner (not shown), one of each set in a vertical plane and the other in a horizontal plane.

It will be apparent that the webs as they leave the bite of the pressure rollers 16 are securely laminated, the thermoplastic adhesive having been thoroughly set by chilling so that the laminated webs may be treated as a unit. Usually the webs are cut into sheets after leaving the feeding rollers 17.

An essential feature of this invention is the successive heating of the separate webs and adhesive, pressing of the heated webs into contact and chilling of the webs and adhesive to set the adhesive and ensure bonding over the entire surface without slippage. The invention is shown and described as applied to the lamination of webs. It will be understood, however, that the invention may, if desired, be employed in the lamination of sheets and that the term "web" as used in the claims is of sufficient scope to include sheet or web material.

Furthermore, while certain structures embodying this invention and the uses thereof have been shown and described, it will be understood that the invention is not limited thereto and that other embodiments and uses come within the spirit and scope of the invention as here set forth.

I claim:

1. The method of laminating two webs of paper one of which webs bears a layer of thermoplastic adhesive on one face thereof, comprising the steps of moistening one of said webs, thereafter heating both said webs independently to substantially the same temperature, subjecting the heated webs with the adhesive layer interposed to pressure, and chilling the webs and adhesive to set the latter while the pressure is being exerted.

2. The method of laminating two webs of paper one of which bears a layer of thermoplastic adhesive on one face thereof, comprising the steps of moistening the non-adhesive bearing web, thereafter heating both webs to substantially the same temperature thereby softening the adhesive layer, and subjecting the webs with the adhesive layer therebetween to pressure and cooling, thereby chilling the adhesive and causing it to set while under such pressure to bond the webs.

3. The method of laminating two webs of paper at least one of which is coated with a layer of thermoplastic adhesive, comprising the steps of independently heating each of said webs to substantially the same temperature to soften the adhesive, progressively bringing said webs together with the softened adhesive therebetween and immediately thereupon applying cold pressure to said webs to chill and set the interposed adhesive, thereby bonding the webs together.

4. An apparatus for laminating two webs of paper one of which is coated with a layer of thermoplastic adhesive comprising a pair of opposed stationary arcuately curved heating surfaces, guide rollers, feed rollers for drawing the webs of paper over said heating surfaces from said guide rollers whereby the thermoplastic adhesive is softened, cooled pressure rollers interposed between said heating surfaces and feed rollers between which the webs are passed with the adhesive layer interposed whereby the heated webs are subjected to pressure and, while the pressure is being exerted the adhesive is chilled and set, said heating surfaces converging toward the bite of the cooled pressure rollers.

5. An apparatus for laminating two webs of paper one of which is coated with a layer of thermoplastic adhesive comprising means for moistening one of said webs previous to lamination, a pair of opposed stationary arcuately curved heating surfaces, guide rollers, feed rollers for drawing the webs of paper over said heating surfaces from said guide rollers whereby the thermoplastic adhesive is softened, cooled pressure rollers interposed between said heating surfaces and feed rollers between which the webs are passed with the adhesive layer interposed whereby the heated webs are subjected to pressure and, while the pressure is being exerted the adhesive is chilled and set, said heating surfaces converging toward the bite of the cooled pressure rollers.

6. An apparatus for laminating two webs of paper one of which is coated with a layer of thermoplastic adhesive comprising a pair of opposed stationary arcuately curved heating surfaces, guide rollers, feed rollers for drawing the webs of paper over said heating surfaces from said guide rollers whereby the thermoplastic adhesive is softened, cooled pressure rollers interposed between said heating surfaces and feed rollers between which the webs are passed with the adhesive layer interposed whereby the heated webs are subjected to pressure and, while the pressure is being exerted the adhesive is chilled and set, said heating surfaces converging toward the bite of the cooled pressure rollers, and an intervening belt of low heat conductivity interposed between the laminated webs and one of the cooled pressure rollers.

WILLIAM B. WESCOTT.